(12) United States Patent
Li et al.

(10) Patent No.: US 7,007,186 B1
(45) Date of Patent: Feb. 28, 2006

(54) SYSTEMS AND METHODS FOR SYNCHRONIZING A SIGNAL ACROSS MULTIPLE CLOCK DOMAINS IN AN INTEGRATED CIRCUIT

(75) Inventors: Zhong-Hua Li, San Jose, CA (US); Anil Kapatkar, San Jose, CA (US); Srinivasan Venkataraman, Fremont, CA (US)

(73) Assignee: Adaptec Corporation, Milpitas, CA (US)

( * ) Notice: Subject to any disclaimer, the term of this patent is extended or adjusted under 35 U.S.C. 154(b) by 522 days.

(21) Appl. No.: 10/074,952

(22) Filed: Feb. 11, 2002

(51) Int. Cl.
*G06F 1/12* (2006.01)
(52) U.S. Cl. ...................... 713/400; 713/600
(58) Field of Classification Search ............. 713/400, 713/600; 327/141, 146
See application file for complete search history.

(56) References Cited

U.S. PATENT DOCUMENTS

| | | | | |
|---|---|---|---|---|
| 4,615,017 A | * | 9/1986 | Finlay et al. | 713/400 |
| 4,745,302 A | * | 5/1988 | Hanawa et al. | 327/160 |
| 4,914,325 A | * | 4/1990 | Yamada | 327/144 |
| 5,128,970 A | * | 7/1992 | Murphy | 375/354 |
| 5,488,628 A | * | 1/1996 | Thoulon | 375/239 |
| 5,510,786 A | * | 4/1996 | Gorshe | 341/73 |
| 5,539,345 A | * | 7/1996 | Hawkins | 327/150 |
| 5,917,340 A | * | 6/1999 | Manohar et al. | 326/82 |
| 6,163,550 A | * | 12/2000 | Alston et al. | 370/503 |
| 6,249,157 B1 | * | 6/2001 | Nakura et al. | 327/117 |
| 6,728,320 B1 | * | 4/2004 | Khasnis et al. | 375/257 |

FOREIGN PATENT DOCUMENTS

| | | | |
|---|---|---|---|
| JP | 3-171820 | * | 7/1991 |
| JP | 3-214084 | * | 9/1991 |

* cited by examiner

*Primary Examiner*—Chun Cao
(74) *Attorney, Agent, or Firm*—IP Strategy Group, PC

(57) ABSTRACT

An integrated circuit configured to capture an input signal to produce an output signal. The input signal is synchronized with a first clock signal. The output signal is synchronized with a second clock signal having a second frequency different from a first frequency associated with the first signal. The integrated circuit includes a first clock domain gating circuit having a first output terminal and a first input terminal. The first clock domain gating circuit is configured to be clocked by the first clock. The first input terminal is coupled to receive the input signal, and the first clock domain gating circuit is configured to toggle a state of a signal on the first output terminal from one of a first state and a second state to the other of the first state and the second state every time a pulse is detected in the input signal, thereby producing a latched output at the first output terminal. The integrated circuit also includes a second clock domain gating circuit having a second output terminal and a second input terminal. The second clock domain circuit is clocked by the second clock. The second input terminal is coupled to the first output terminal to receive the latched output, and the second clock domain gating circuit is configured to produce a pulse on the output signal at the second output terminal, with the pulse on the output signal having a duration at least as long as a period of the second clock every time a state of the latched output changes.

21 Claims, 7 Drawing Sheets

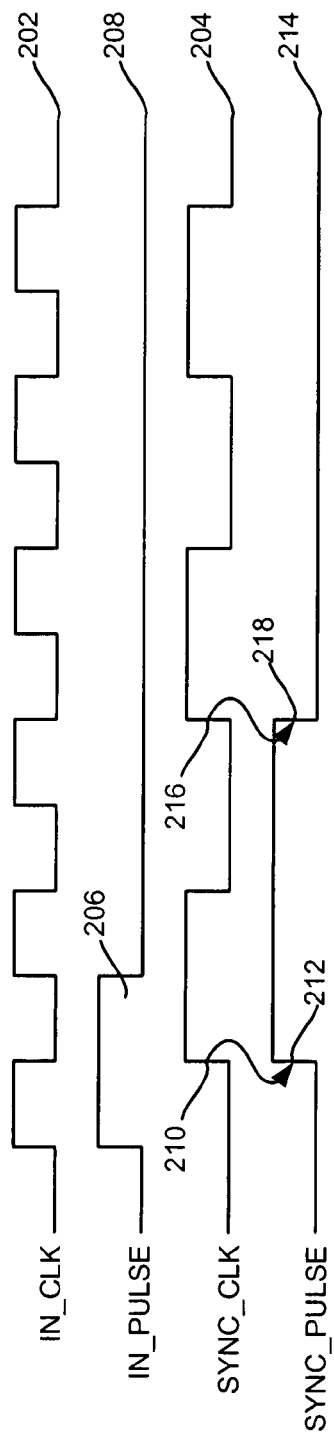
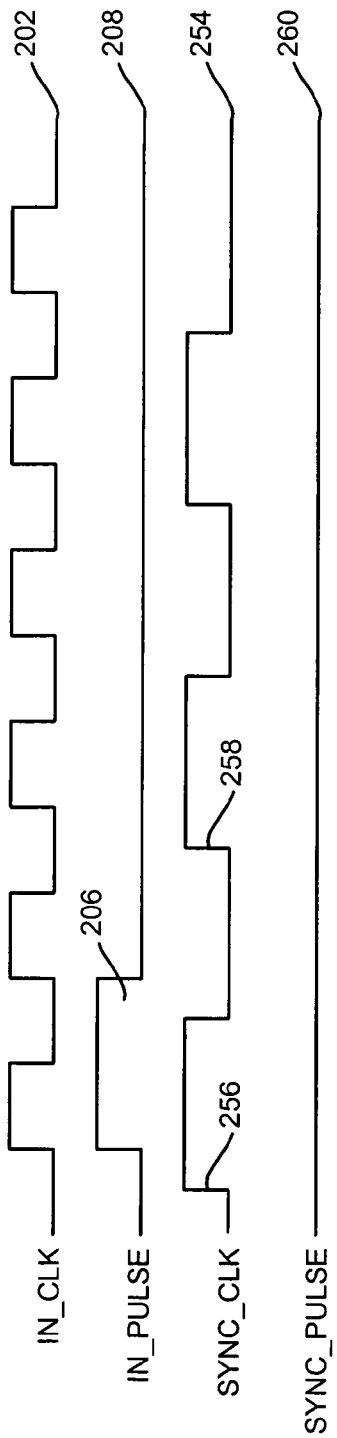
FIG. 2A (PRIOR ART)
FIG. 2B (PRIOR ART)

SYSTEMS AND METHODS FOR SYNCHRONIZING A SIGNAL ACROSS MULTIPLE CLOCK DOMAINS IN AN INTEGRATED CIRCUIT

BACKGROUND OF THE INVENTION

The present invention relates to techniques for synchronizing a signal across multiple clock domains. More particularly, the present invention relates to techniques and circuits for efficiently and reliably capturing an input signal synchronized with a first clock having a first clock frequency and for producing an output signal synchronized with a second clock having a second clock frequency different from the first clock frequency.

As integrated circuits (ICs) become more complex, designers are constantly looking for ways to pack more functionalities into the IC chip. A higher level of functionality typically necessitates multiple clock domains, with each clock domain handling a different subcircuit of the IC. Generally speaking, once can expect multiple asynchronous clocks in an IC having a moderate to high level of complexity.

One of the challenges in working with multiple clock domains is the need to synchronize a signal across multiple clock domains. Take for example a control signal. A pulse on a control signal that is synchronized with one clock domain may be employed to control other circuitries clocked by another clock domain having a different frequency and/or phase.

When synchronizing a signal across two different clock domains, two possibilities exist. In the first case, the first clock domain is the slower of the two, and in the second case, the first clock domain is the faster clock domain. When a signal needs to be passed from a slower clock domain to a faster clock domain, one typically expects the faster clock domain, with its higher frequency, to have no difficulty capturing pulses on the signal that has been synchronized using the slower clock domain. FIG. 1 illustrates this case wherein IN_CLK (102) is the slower clock signal and SYNC_CLK (104) is the faster clock signal. A signal IN_PULSE (106) that is synchronized with respect to the slower IN_CLK (102) is also shown. Since the clock signal SYNC_CLK (104) is faster than the clock signal IN_CLK (102), one expects no difficulty in using the clock signal SYNC_CLK (104) in capturing pulse 110 of the signal IN_PULSE (106) to produce the pulse 112 on the output signal SYNC_PULSE (108).

In the second case, as mentioned, the second clock domain is the slower one. In this case, it is more difficult to reliably capture the signal, and a simple latching circuit that simply latches the state of the input signal using the second clock will typically not suffice. The difficulties involved in capturing a signal using a slower clock are illustrated below in connection with FIG. 2A and FIG. 2B. In FIGS. 2A and 2B, the faster first clock, the input signal, and the slower second clock are the same except that in the case of FIG. 2B, there is a phase shift with respect to the slower second clock. As will be seen, unless a specialized circuit is employed, the phase shift will by happenstance cause a simple latching arrangement to miss the input pulse on the input signal entirely, thereby producing erroneous results.

Referring now to FIG. 2A, there is shown a clock IN_CLK 202, which has a higher frequency than the slower clock SYNC_CLK 204. A pulse 206 is shown on signal IN_PULSE 208, which is synchronized with respect to the faster clock IN_CLK 202. As shown, upon a rising edge 210 of the slower clock SYNC_CLK 204, the high state of signal IN_PULSE 208 is detected, giving rise to a rising edge 212 of the output signal SYNC_PULSE 214. Upon a rising edge 216 of the slower clock SYNC_CLK 204, the low state of IN_PULSE 208 is detected, resulting in a falling edge 218 of the output signal SYNC_PULSE 214. As it happens, the pulse 206 on signal IN_PULSE 208 can be captured by the slower clock SYNC_CLK 204 in the example of FIG. 2A (as evidenced by the pulse between reference numbers 212 and 218 on the SYNC_PULSE 214 signal).

Consider now the example of FIG. 2B. Again, FIG. 2B shows the clock IN_CLK 202 as in FIG. 2A, as well as the signal IN_PULSE 208 with its pulse 206. There is also shown a slower clock SYNC_CLK 254. However, the slower clock SYNC_CLK 254 of FIG. 2B has a different phase relationship with respect to the faster clock IN_CLK 202 and the pulse 206 on the signal IN_PULSE 208, as compared with the clock signal SYNC_CLK 204 of FIG. 2A. In this case, upon a rising edge 256 of the slower clock SYNC_CLK 254 of FIG. 2B, the signal IN_PULSE 208 is still low. Upon the next rising edge 258 of the slower clock SYNC_CLK 254, one sees that the pulse 206 on signal IN_PULSE 208 has come and gone. When rising edge 258 happens, the signal IN_PULSE 208 is again low. Thus, no pulse is produced on the output signal SYNC_PULSE 260 of FIG. 2B despite the presence of a pulse on the input signal IN_PULSE 208. If a simple latching arrangement is employed for the synchronization task, the slower clock SYNC_CLK 254 has simply failed to capture the pulse on signal IN_PULSE 208.

In the prior art, a variety of different techniques has been proposed and employed to ensure that an input signal can be reliably synchronized across different clock domains. One of the more popular circuits for synchronizing a signal between two different clock domains is shown in prior art FIG. 3. The prior art circuit of FIG. 3 is best understood with reference to the timing diagram of FIG. 4.

Referring now to FIG. 3, there is shown a prior art circuit 300 for synchronizing a signal IN_PULSE 302 across two different clock domains: from a faster clock IN_CLK 304 to a slower clock SYNC_CLK 306. There are shown four cascaded D flip-flops Q0, Q1, Q2, and Q3. The input signal IN_PULSE is inputted into an input terminal of an OR gate 382, the output of which is inputted into the enable input of the first cascaded D flip-flop Q0. This first cascaded D flip-flop Q0 is clocked by the clock signal IN_CLK 304 as shown.

Initially, a multiplexer 320 is selected by signal CLEAR_Q0 to provide a "1" at the data input D of the first cascaded D flip-flop Q0. Upon a rising edge 422 (see FIG. 4) of signal IN_CLK 304, the signal IN_PULSE 302 goes high. At the next rising edge 424 of clock IN_CLK 304, D flip-flop Q0 latches the high data value provided at its data input, and thus causes Q0 output to go high starting with rising edge 426 thereof. Note that since D flip-flop Q0 is clocked by the faster clock IN_CLK 304, it is assured that the pulse on signal IN_PULSE 302 can be captured since signal IN_PULSE 302 is originally in the domain of the faster clock IN_CLK 304.

The high value at Q0 output is propagated to the outputs of subsequent cascaded D flip-flops Q1, Q2, and Q3. That is, the output of one D flip-flop is fed into the data input of the next cascaded D flip-flop. Since these D flip-flops Q1, Q2, and Q3 are clocked by the slower clock SYNC_CLK 306, it can be seen that the rising edge 428 on Q1 output follows the rising edge 430 of the clock SYNC_CLK 306, the rising edge 432 on Q2 output follows the rising edge 434 of the clock SYNC_CLK 306, and the rising edge 436 on Q3 output follows the rising edge 438 of the clock SYNC_CLK 306.

The value at Q2 output is fed into one input of an AND gate 340. The other input of AND gate 340 receives the inverted value of Q3 output. At the time Q2 output goes high at rising edge 432 thereof, the value of Q3 output is low. Consequently, AND gate 340 will output a high. Since the output of AND gate 340 is the desired output signal SYNC_PULSE 342, this transition from low to high is seen at the rising edge 444 of output signal SYNC_PULSE 342.

When Q3 output goes high starting with rising edge 436 thereof, AND gate 340 will output a low, which is seen by the transition at falling edge 446 of output signal SYNC_PULSE 342. Thus, irrespective of the width of the pulse in the input signal IN_PULSE 302, that pulse is captured in the slower clock domain SYNC_CLK 306.

The signal SYNC_PULSE 342, which is the output of AND gate 340, is fed back into a series of cascaded D flip-flops P0, P1, P2, and P3 through an OR gate 380. Cascaded D flip-flops P0, P1, P2, and P3 are employed to reset the D flip-flops Q0, Q1, Q2, and Q3 back to their ready state in order to prepare D flip-flops Q0, Q1, Q2, and Q3 to service the next pulse on signal IN_PULSE 302.

As shown in FIG. 3, the output of AND gate 340 is inputted into an input terminal of OR gate 380. The output of this OR gate 380 is inputted into the enable input of the first cascaded D flip-flop P0. A multiplexer 350 is controlled by the Q2 output (which has been latched high since rising edge 432 thereof), thereby furnishing a high value to the data input D of the first cascaded D flip-flop P0. The value of signal SYNC_PULSE 342 (and therefore the output of OR gate 380, which is inputted into the enable input of D flip-flop P0) is also high when rising edge 438 occurs on signal SYNC_CLK 306 before AND gate 340 pulls the signal SYNC_PULSE 342 low. The high enable input of D flip-flop P0 (from the high state of signal SYNC_CLK 342), in combination with high state of data input D of D flip-flop P0 (from multiplexer 350, which is selected by output Q2) and a rising edge 438 of clock SYNC_CLK 306 causes D flip-flop P0 to latch the high value at its data input D to its P0 output. This is seen by the rising edge 448 on P0 output.

This P0 output value is subsequently cascaded to D flip-flops P1, P2, and P3. Since these D flip-flops P1, P2, and P3 are clocked by the faster clock IN_CLK 304, it can be seen that the rising edge 450 on P1 output follows the rising edge 452 of the clock IN_CLK 304, the rising edge 454 on P2 output follows the rising edge 456 of the clock IN_CLK 304, and the rising edge 458 on P3 output follows the rising edge 460 of the clock IN_CLK 304.

The value at P2 output is fed into one input of an AND gate 370. The other input of AND gate 370 receives the inverted value of P3 output. At the time P2 output goes high at rising edge 454 thereof, the value of P3 output is low. Consequently, AND gate 370 will output a high. This transition from low to high is seen at the rising edge 462 of the CLEAR_Q0 signal.

The high state of the CLEAR_Q0 signal when P2 output goes high is seen at the select input of multiplexer 320, which causes multiplexer 320 to furnish a low value to the data input D of D flip-flop Q0. This CLEAR_Q0 signal is also inputted into one input terminal of an OR gate 382, the output of which is inputted into the enable terminal of D flip-flop Q0. Since D flip-flop Q0 is clocked by clock IN_CLK 304, the next rising edge 460 of clock IN_CLK 304 causes the low value at the data input D of D flip-flop Q0 to be latched at Q0 output (since the high CLEAR_Q0 enables D flip-flop Q0 via OR gate 382). This is seen by the falling edge 466 of Q0 output.

This low value of Q0 output is cascaded to D flip-flops Q1, Q2, and Q3 respectively with each subsequent rising edge of clock SYNC_CLK 306 (since D flip-flops Q1, Q2, and Q3 are clocked by clock SYNC_CLK 306). Thus, it can be seen that the falling edge 468 on Q1 output follows the rising edge 470 of the clock SYNC_CLK 306, the falling edge 472 on Q2 output follows the rising edge 474 of the clock SYNC_CLK 306, and the falling edge 476 on Q3 output follows the rising edge 478 of the clock SYNC_CLK 306. D flip-flops Q1–Q3 are now resetted back to their ready state.

Earlier when P3 output goes high starting with rising edge 458 thereof, AND gate 370 will output a low, which is seen by the transition at falling edge 464 of the CLEAR_Q0 signal. This low state of the CLEAR_Q0 signal causes multiplexer 320 to provide a high value to the data input D of D flip-flop Q0. D flip-flops Q0 is thus resetted back to its ready state, with a high value at its data input D and awaiting the next pulse on its enable input.

To complete the resetting process, the D flip-flops P0–P3 are reset next. Since D flip-flop P0 is clocked by the slower clock SYNC_CLK 306, at the moment rising edge 478 occurs on SYNC_CLK 306, the value Q2 output is already low (after falling edge 472 on Q2). This low value of Q2 output selects multiplexer 350 to cause multiplexer 350 to provide a low value to the data input of D flip-flop P0. Furthermore, the low value of Q2 output causes the OR gate 380 to output a high (since inverted Q2 or Q2! will be high). The high output of OR gate 380 enables D flip-flop P0, causing the low data value at the data input of D flip-flop P0 to be latched at P0 output. This is evidenced by the falling edge 482 of P0 output signal.

The low state of P0 output is cascaded to D flip-flops P1, P2, and P3. Since these D flip-flops P1, P2, and P3 are clocked by the faster clock IN_CLK 304, it can be seen that the falling edge 484 on P1 output follows the rising edge 486 of the clock IN_CLK 304, the falling edge 488 on P2 output follows the rising edge 490 of the clock IN_CLK 304, and the falling edge 492 on P3 output follows the rising edge 494 of the clock IN_CLK 304.

After the output of D flip-flop P3 is reset to the low state (i.e., after falling edge 492 on P3 output), the circuit 300 of FIG. 3 is reset and ready to service the next pulse on input signal IN_PULSE 302.

Although circuit 300 of FIG. 3 can reliably synchronize an input signal from one clock domain to another clock domain, there are disadvantages in terms of size, speed, and delay. In terms of size, there is a total of 8 D flip-flops (Q0–Q3 and P0–P3), two multiplexers (320 and 350), 2 OR gates (380 and 382), and 2 AND gates (340 and 370), or a total of 14 different sub-circuits. As circuit designers are constantly trying to pack more functionalities into a finite size IC, the high number of gate count is disadvantageous, both in terms of real estate consumption and in terms of power consumption (since power consumption rises as the gate count increases).

In terms of speed, the circuit 300 of FIG. 3 needs a total of 3 SYNC_CLK periods (referenced by rising edges 430, 434, and 438), followed by 3 IN_CLK periods (referenced by rising edges 452, 456, and 460), followed by 3 SYNC_CLK periods (referenced by rising edges 470, 474, and 478), followed by two more IN_CLK periods (referenced by rising edges 486, and 490) or a total of 6 SYNC_CLK periods and 5 IN_CLK period, in order to capture a single pulse on input signal IN_PULSE 302 and to reset itself to be ready to capture the next pulse on input signal IN_PULSE 302. The long delay period waiting for circuit 300 to complete its capture-and-reset cycle negatively impacts performance.

In terms of power consumption, beside the high level of power consumption due to the high gate count, circuit 300 also toggles all 8 of its flip-flops high and then low each time a pulse on the input signal IN_PULSE 302 is synchronized. That is, the outputs of the D flip-flops Q0–Q3 and P0–P3 go high and then are reset to the low state each time a pulse on input signal IN_PULSE 302 is captured. In ICs which are constrained in terms of power consumption and/or heat generation, the high level of power consumed to toggle these 8 D flip-flops (Q0–Q3 and P0–P3) high and then low for each pulse captured is a significant disadvantage.

In view of the foregoing, there are desired improved circuits and methods for reliably synchronizing an input signal across multiple clock domains. Compared to the prior art, the improved circuits and methods preferably perform the synchronizing task with a greater degree of efficiency in terms of gate count, delay, and power consumption.

SUMMARY OF THE INVENTION

The invention relates, in one embodiment, to an integrated circuit configured to capture an input signal to produce an output signal. The input signal is synchronized with a first clock signal. The output signal is synchronized with a second clock signal having a second frequency different from a first frequency associated with the first signal. The integrated circuit includes a first clock domain gating circuit having a first output terminal and a first input terminal. The first clock domain gating circuit is configured to be clocked by the first clock. The first input terminal is coupled to receive the input signal, and the first clock domain gating circuit is configured to toggle a state of a signal on the first output terminal from one of a first state and a second state to the other of the first state and the second state every time a pulse is detected in the input signal, thereby producing a latched output at the first output terminal. The integrated circuit also includes a second clock domain gating circuit having a second output terminal and a second input terminal. The second clock domain circuit is clocked by the second clock. The second input terminal is coupled to the first output terminal to receive the latched output, and the second clock domain gating circuit is configured to produce a pulse on the output signal at the second output terminal, with the pulse on the output signal having a duration at least as long as a period of the second clock every time a state of the latched output changes.

The invention relates, in one embodiment, to a method for forming an integrated circuit configured to capture an input signal to produce an output signal. The input signal is synchronized with a first clock signal. The output signal is synchronized with a second clock signal having a second frequency different from a first frequency associated with the first signal. The method includes providing a first clock domain gating circuit having a first output terminal and a first input terminal. The first clock domain gating circuit is configured to be clocked by the first clock, and the first input terminal is coupled to receive the input signal. The first clock domain gating circuit is configured to toggle a state of a signal on the first output terminal from one of a first state and a second state to the other of the first state and the second state every time a pulse is detected in the input signal, thereby producing a latched output at the first output terminal. The method also includes providing a second clock domain gating circuit having a second output terminal and a second input terminal. The second clock domain circuit is clocked by the second clock, and the second input terminal is coupled to the first output terminal to receive the latched output. The second clock domain gating circuit is configured to produce a pulse on the output signal at the second output terminal. The pulse on the output signal has a duration at least as long as a period of the second clock every time a state of the latched output changes.

In one embodiment, the first clock domain gating circuit includes a first D flip-flop, wherein the first input terminal is coupled to an ENABLE input of the first D flip-flop, and the first output terminal is coupled to a first output terminal of the first D flip-flop. The first D flip-flop further includes a first complementary output terminal and a first data input terminal, the first complementary output terminal being coupled to the first data input terminal.

In another embodiment, the second clock domain gating circuit includes a plurality of cascaded D flip-flops and an XOR gate, wherein the second input terminal is coupled to a data input terminal of one of the plurality of cascaded D flip-flops. An output of a next-to-last cascaded D flip-flop plurality of cascaded D flip-flops is coupled to a first input of the XOR gate, and an output of a last-cascaded D flip-flop of the plurality of cascaded D flip-flops is coupled to a second input of the XOR gate, wherein the second output terminal of the second clock domain gating circuit is coupled to an output terminal of the XOR gate.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B are timing diagrams illustrating the difficulties involved in synchronizing, using a slower clock, of an input signal that is originally synchronized with a faster clock.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided an improved synchronizing circuit for reliably and efficiently synchronizing an input signal across multiple clock domains. In one embodiment, there is provided an improved synchronizing circuit for synchronizing an input signal, which is originally synchronized in a first clock domain, with a second clock associated with a second clock domain. The synchronizing circuit includes two sub-circuits: a first clock domain gating circuit for capturing the input signal using the first clock domain, and a second domain gating circuit for producing the output signal synchronized with the second clock associated with the second clock domain.

In one embodiment, the first clock domain gating circuit includes a D flip-flop clocked by the first clock. The D flip-flop is configured to latch the pulse detected at its enable input and to provide the latched state at its output. The second clock domain gating circuit includes a plurality of cascaded D flip-flops clocked by the second clock and an XOR gate. The output of the D flip-flop of the first domain gating circuit is provided to the data input of the first cascaded D flip-flop of the second clock domain gating circuit, and the signal is propagated to other D flip-flops of the plurality of D flip-flops of the second clock domain gating circuit. The next-to-last cascaded and the last cascaded D flip-flops of the second clock domain gating circuit output to an XOR gate. The output of the XOR gate represents the output signal synchronized with the second clock associated with the second clock domain. Advantageously, the inventive circuit for synchronizing the input signal across multiple clock domains requires fewer gates, consumes less power, and can operate at a higher speed than possible with the prior art circuit.

Figure 5:
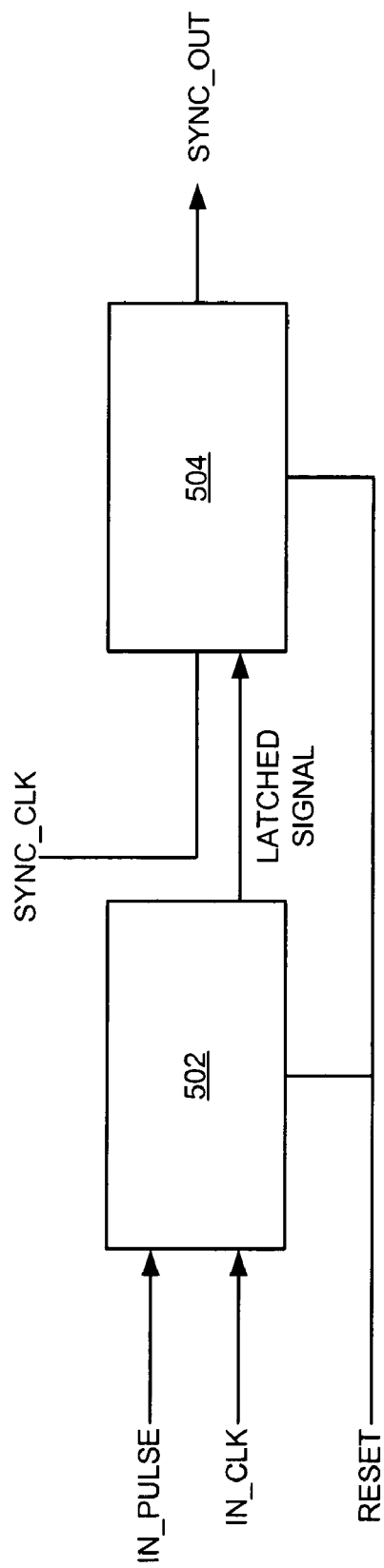
FIG. 5 illustrates, in accordance with one embodiment of the present invention, a high-level diagram of an improved synchronizing circuit for reliably and efficiently synchronizing an input signal across multiple clock domains.

The features and advantages of the present invention may be better understood with reference to the drawings and discussion that follow. Referring now to FIG. 5, there is shown, in accordance with one embodiment of the present invention, a high-level diagram of the improved synchronizing circuit. In FIG. 5, a synchronizing circuit 500 includes two sub-circuits: a first clock domain gating circuit 502 and a second clock domain gating circuit 504. First clock domain gating circuit 502 receives the input signal IN_PULSE and is clocked by the first clock IN_CLK. Since the input signal IN_PULSE is already synchronized in the first clock domain, the use of the first clock IN_CLK to clock the first clock domain gating circuit ensures that the pulses on input signal IN_PULSE can be reliably detected and latched.

Upon detecting the presence of a pulse on input signal IN_PULSE, the output of first clock domain gating circuit 502 toggles or switches to a value that is complementary to the value it had before the detection of the pulse on input signal IN_PULSE. Furthermore, the output of first clock domain gating circuit 502 stays latched at its post-toggle state until the next pulse on input signal IN_PULSE is detected, which detection causes the output of first clock domain gating circuit 502 to toggle again. In this manner, the invention differs from the prior art circuit of FIG. 3 in that there is no need to "reset" the circuit back to the state it was in prior to the detection of the pulse in order to get the circuit ready to capture the next pulse on the IN_PULSE signal.

The latched output from the first clock domain gating circuit 502 is provided to the second clock domain gating circuit 504 as shown. The second clock domain gating circuit 504 is clocked by the second clock SYNC_CLK associated with the second clock domain. The second clock domain gating circuit 504 is configured to create a pulse on the output signal SYNC_OUT, which pulse has a width that is sufficient wide to guarantee detection by a subcircuit synchronized with the second clock, every time a pulse is detected on the input signal IN_PULSE by the first clock domain gating circuit. Since the detection of a pulse on the input signal IN_PULSE causes a change in the state of the latched output of the first clock domain gating circuit, the second clock domain gating circuit essentially produces a pulse that is synchronized with the second clock SYNC_PULSE every time there is a change in the state of the latched output from the first clock domain gating circuit.

Figure 6:
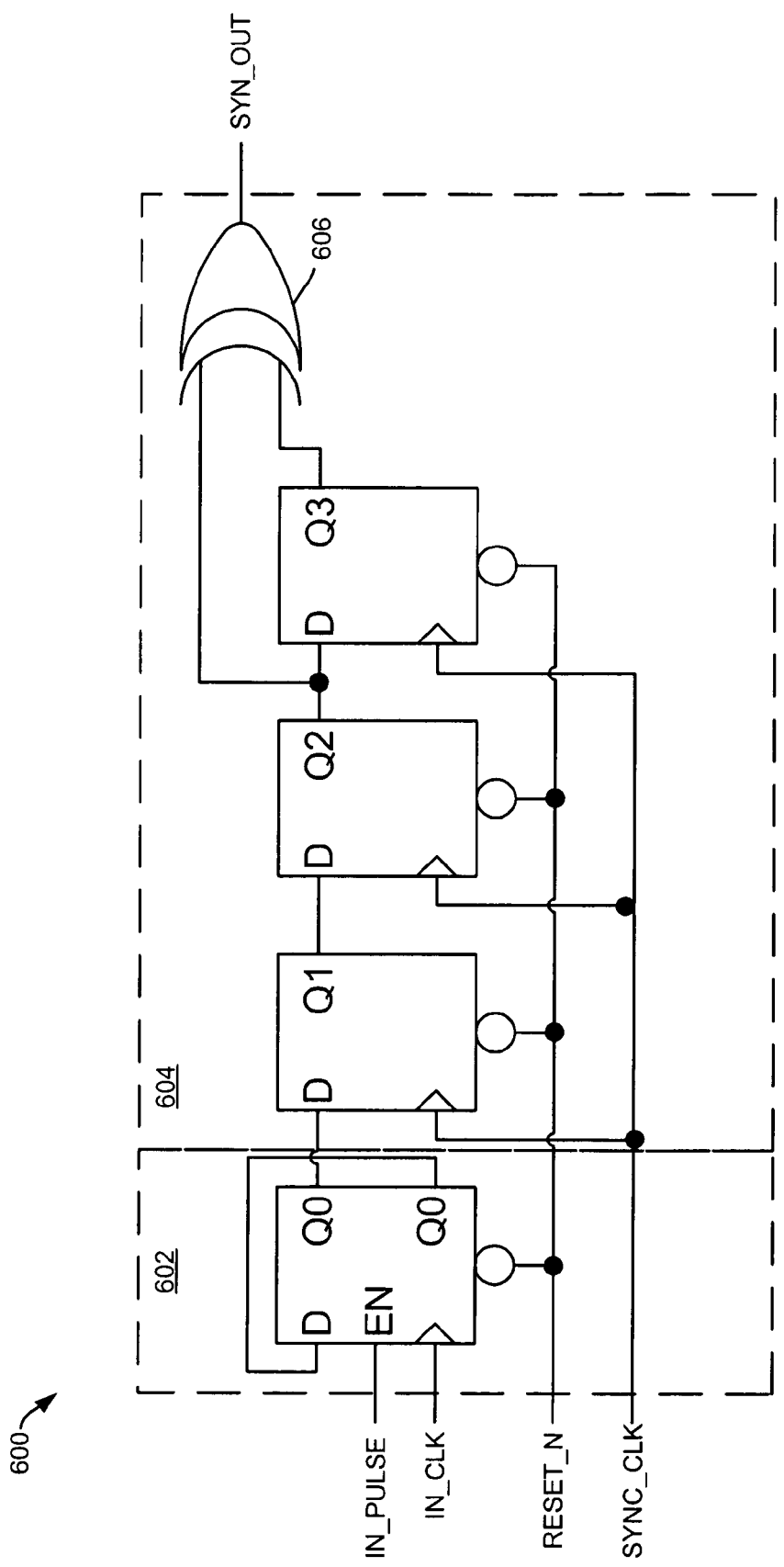
FIGS. 6 and 7 are a circuit diagram and a timing diagram respectively to illustrate one embodiment of the inventive synchronizing circuit for reliably and efficiently synchronizing an input signal across multiple clock domains.

FIG. 6 shows, in accordance with one embodiment of the present invention, the circuit of FIG. 5 in greater detail. Compared with the prior art synchronization circuit of FIG. 3, synchronizing circuit 600 employs fewer D flip-flops and none of the required multiplexers (e.g., multiplexers 320 and 350 of FIG. 3). Further, instead of employing two AND gates (e.g., AND gates 340 and 370 of FIG. 3) and two OR gates (e.g., OR gates 380 and 382 of FIG. 3), a single XOR gate is employed to output the desired synchronized output signal.

Referring now to FIG. 6, a first clock domain gating circuit 602 is implemented using a D flip-flop Q0. D flip-flop Q0 receives the input signal IN_PULSE at its enable input. Further, D flip-flop Q0 is clocked by the clock IN_CLK, representing the clock on which the input signal IN_PULSE is synchronized. Immediately after the circuit starts up (e.g., after being reset by the signal Reset_n), the output Q0 of D flip-flop Q0 is low. Conversely, the complementary output (Q0)! is high. This complementary output is, in accordance with one aspect of the present invention, fed back into the data input D of D flip-flop Q0 as shown. Using the clock on which the input signal is synchronized to capture the pulse on the input signal and employing the input signal IN_PULSE as the enable signal for D flip-flop Q0 ensure the successful capture of pulses on the input signal IN_PULSE by D flip-flop Q0.

Figure 7:
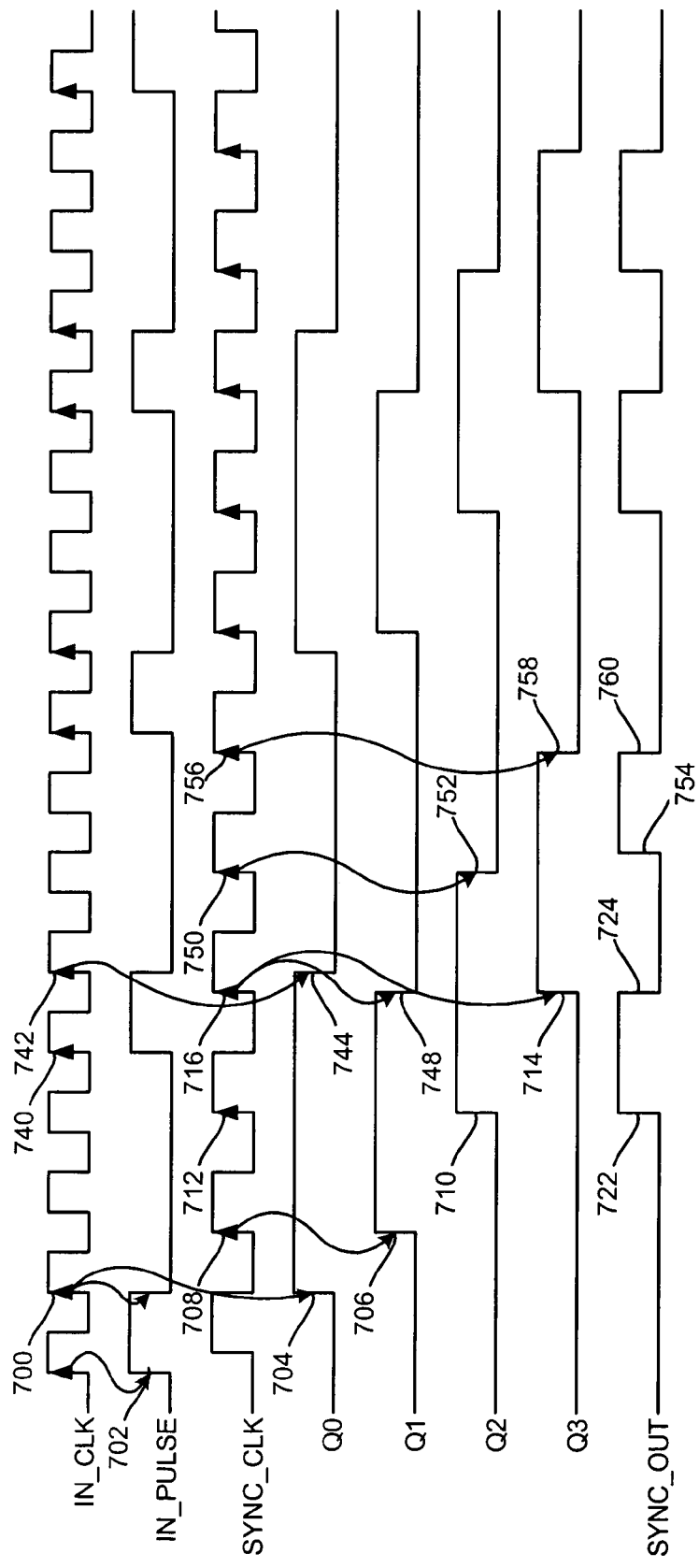

When a pulse is present on the input signal IN_PULSE, the output Q0 of D flip-flop Q0 will be latched or gated high. In FIG. 7, upon a rising edge 700 of the input clock IN_CLK, the high state of the input signal IN_PULSE causes output Q0 to transition from low to high (as seen by rising edge 704 of output signal Q0). As will be seen, the state of output signal Q0 will stay high until the next pulse is presented on the input signal IN_PULSE.

The high value of the output signal Q0 is propagated through the cascaded D flip-flops of the second clock domain gating circuit 604. As shown in FIG. 6, cascaded D flip-flops Q1, Q2, and Q3 of the second domain gating circuit 604 are clocked by the clock SYNC_CLK, which may have a different frequency and/or phase with respect to the input clock IN_CLK (e.g., the clock SYNC_CLK may be slower than IN_CLK). One of the main functions of the second clock domain gating circuit 604 is to synchronize the pulses on input signal IN_PULSE with the clock SYNC_CLK. Thus the first D flip-flop Q1 of the second clock domain gating circuit 604 receives the output signal Q0, the state of which has been flipped with the detection of a pulse on input signal IN_PULSE, and propagates the state of output signal Q0, upon a rising edge of the clock SYNC_CLK, through to the output Q1, which is coupled to the input of the next cascaded D flip-flop Q2. With respect to FIG. 7, this is shown by the rising edge 706 of output Q1, which occurs upon the rising edge 708 of the clock SYNC_CLK.

The second cascaded D flip-flop Q2 of the second clock domain gating circuit 604 receives the output signal Q1 and propagates the state of output signal Q1, upon the next rising edge of the clock SYNC_CLK, through to the output Q2, which is coupled to the input of the next cascaded D flip-flop Q3. With respect to FIG. 7, this is shown by the rising edge 710 of output Q2, which occurs upon the rising edge 712 of the clock SYNC_CLK.

Since the second clock domain gating circuit 604 employs three cascaded flip-flops, the D flip-flop Q3 represents the last cascaded D flip-flop. This last cascaded D flip-flop Q3 receives the output signal Q2 from the next-to-last cascaded D flip-flop Q2 and propagates the state of output signal Q2, upon the next rising edge of the clock SYNC_CLK, through to the output Q3. With respect to FIG. 7, this is shown by the rising edge 714 of output Q3, which occurs upon the rising edge 716 of the clock SYNC_CLK.

XOR gate 606 of the second clock domain gating circuit 604 receives as its two inputs the output Q2 of the next-to-last cascaded D flip-flop Q2 and the output Q3 of the last cascaded D flip-flop Q3. Essentially, XOR gate 606 compares the two outputs Q2 and Q3 and outputs a high value only when they are different. Thus, when output Q2 first become high upon a rising edge 712 of clock signal SYNC_CLK, the output Q3 is still low. This cause the output SYNC_OUT of XOR gate 606 to go high. With respect to FIG. 7, this is illustrated by the rising edge 722 of the signal SYNC_OUT, which happens after the occurrence of rising edge 712 of the clock SYNC_CLK. After rising edge 716 occurs, the output Q3 of D flip-flop Q3 goes high (see rising edge 714 on signal Q3), causing the output signal Q2 and the output signal Q3 to have the same value. Accordingly, XOR gate 606 outputs a low value, which is evidenced by the falling edge 724 on output signal SYNC_OUT.

Thus, the pulse which starts with a rising edge 702 on input signal IN_PULSE (which itself is in the IN_CLK clock domain) is captured in the SYNC_CLK domain in the form of a pulse having a duration at least as long as the period of the clock SYNC_CLK to be used as a control signal for other circuitries synchronized with the SYNC_CLK clock.

Note that the outputs Q0, Q1, Q2, and Q3 continue to stay at their latched state until the next pulse occurs on input signal IN_PULSE. In FIG. 7, after the input signal IN_PULSE goes from low to high at rising edge 740 on clock IN_CLK, representing the arrival of the next pulse on the input signal IN_PULSE, the next rising edge 742 on clock IN_CLK causes the state of output Q0 to flip from its current high state to a low state. This is shown by falling edge 744 on output signal Q0. Output signal Q0 goes low because when output signal Q0 went high earlier following rising edge 704 on output signal Q0, its complementary output signal (Q0)! went low. As mentioned, the complementary output signal (Q0)! is fed back into the data input D of D flip-flop Q0. It is this low state at the data input D of D flip-flop Q0 that gets propagated to the output signal Q0 upon the occurrence of rising edge 742 on clock IN_CLK in the presence of a pulse on input signal IN_PULSE (which is fed into the enable input of the D flip-flop Q0).

This high-to-low transition on output signal Q0 (evidenced by falling edge 744) is progressively propagated to each subsequent cascaded D flip-flop of the second clock domain gating circuit 604. Thus, upon a rising edge 716 on clock SYNC_CLK, output signal Q1 transitions from high-to-low as shown by falling edge 748 thereof. Upon the next rising edge 750 on clock SYNC_CLK, output signal Q2 transitions from high-to-low as shown by falling edge 752 thereof. The low state of output signal Q2 causes XOR gate 606 to output a high value since output Q3 is still high at this point (from the last input pulse). The low-to-high transition of the output of XOR gate 606 is shown by rising edge 754 on output signal SYNC_OUT. Thus, the start of a newly captured pulse is shown on output signal SYNC_OUT.

Upon the next rising edge 756 on clock SYNC_CLK, output signal Q3 transitions from high-to-low as shown by falling edge 758 thereof. The low state of output signal Q3 causes XOR gate 606 to output a low value since the value at output Q3 is now equal to the value at the output of Q2. This high-to-low transition of the output of XOR gate 606 is shown by falling edge 760 on output signal SYNC_OUT. Thus, another pulse on input signal IN_PULSE is captured and synchronized in the SYNC_CLK domain.

Note that since the complementary output signal (Q0)! is fed back into the data input D of D flip-flop Q0, the value of (Q0)!, which is high after the output signal Q0 goes low at falling edge 744, is now present at the data input D of D flip-flop Q0, waiting for the arrival of the next pulse on input signal IN_PULSE. Thus, after every two pulses on the input signal IN_PULSE, the entire synchronizing circuit is back to its original state. Note that there is no need to reset the D flip-flops after servicing every pulse on the input signal, as was required in the prior art circuit of FIG. 3, in order to get those D flip-flops ready for the next pulse on the input signal.

Figure 1:
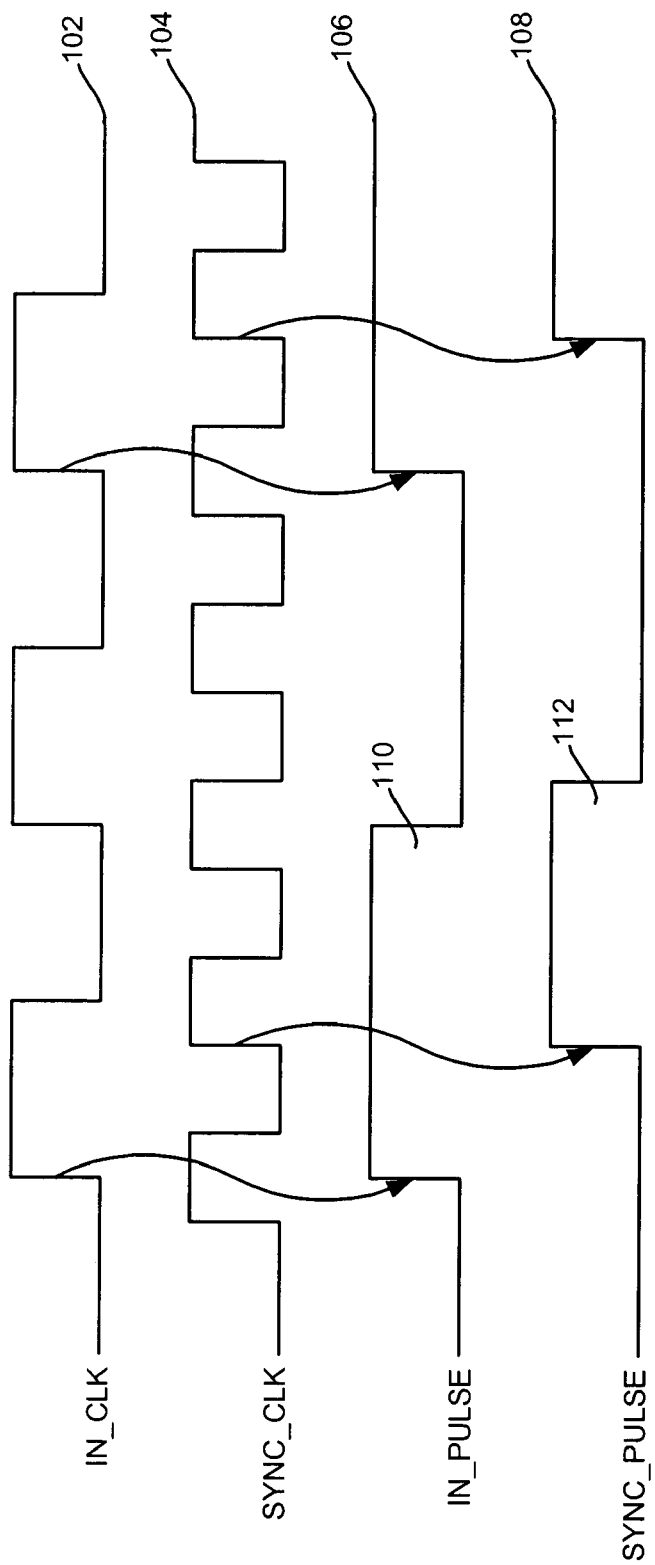
FIG. 1 is a timing diagram illustrating the synchronization, using a faster clock, of an input signal that is originally synchronized with a slower clock.
Figure 3:
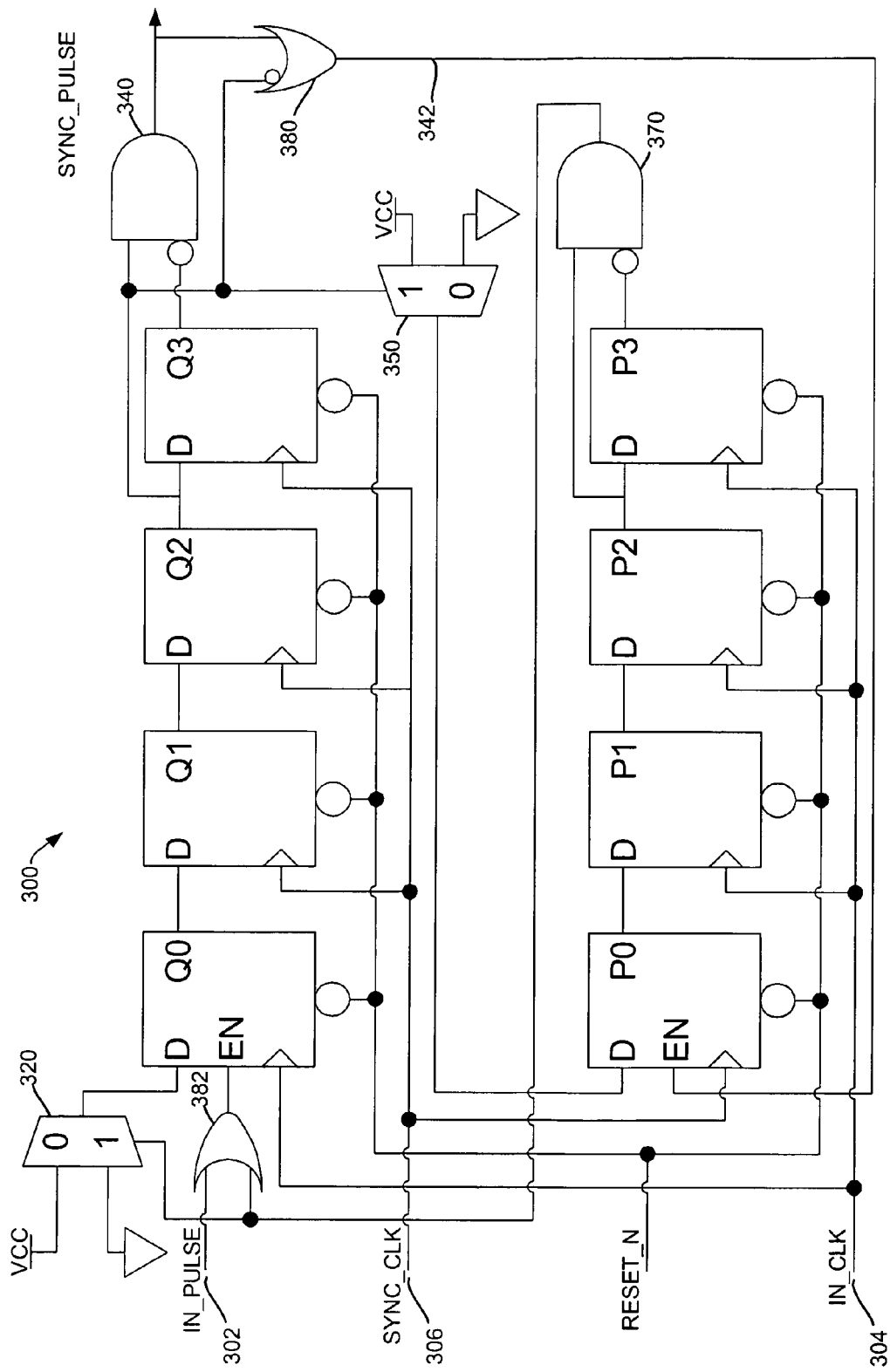
FIGS. 3 and 4 are a circuit diagram and a timing diagram respectively to illustrate one prior art approach for reliably synchronizing, using a slower clock, of an input signal that is originally synchronized with a faster clock.

As compared with the prior art implementation of FIG. 3, there are fewer D flip-flops, and none of the multiplexers, OR gates, and AND gates in the implementation of FIG. 6. In some implementations, up to a 60% reduction in gate count can be expected as compared to the gate count required by prior art synchronization circuits. The lower gate count reduces both real estate usage on the resultant IC and the power consumption. Furthermore, since the D flip-flops of the implementation of FIG. 6 do not need to be toggled back, or flipped back, to their original state prior to servicing the next input pulse, less power is consumed. The lower gate count and reduced power consumption features of the implementation of FIG. 6 represent significant advantages to IC designers looking for ways to pack more functionalities into an IC while simultaneously trying to reduce power consumption.

Figure 4:
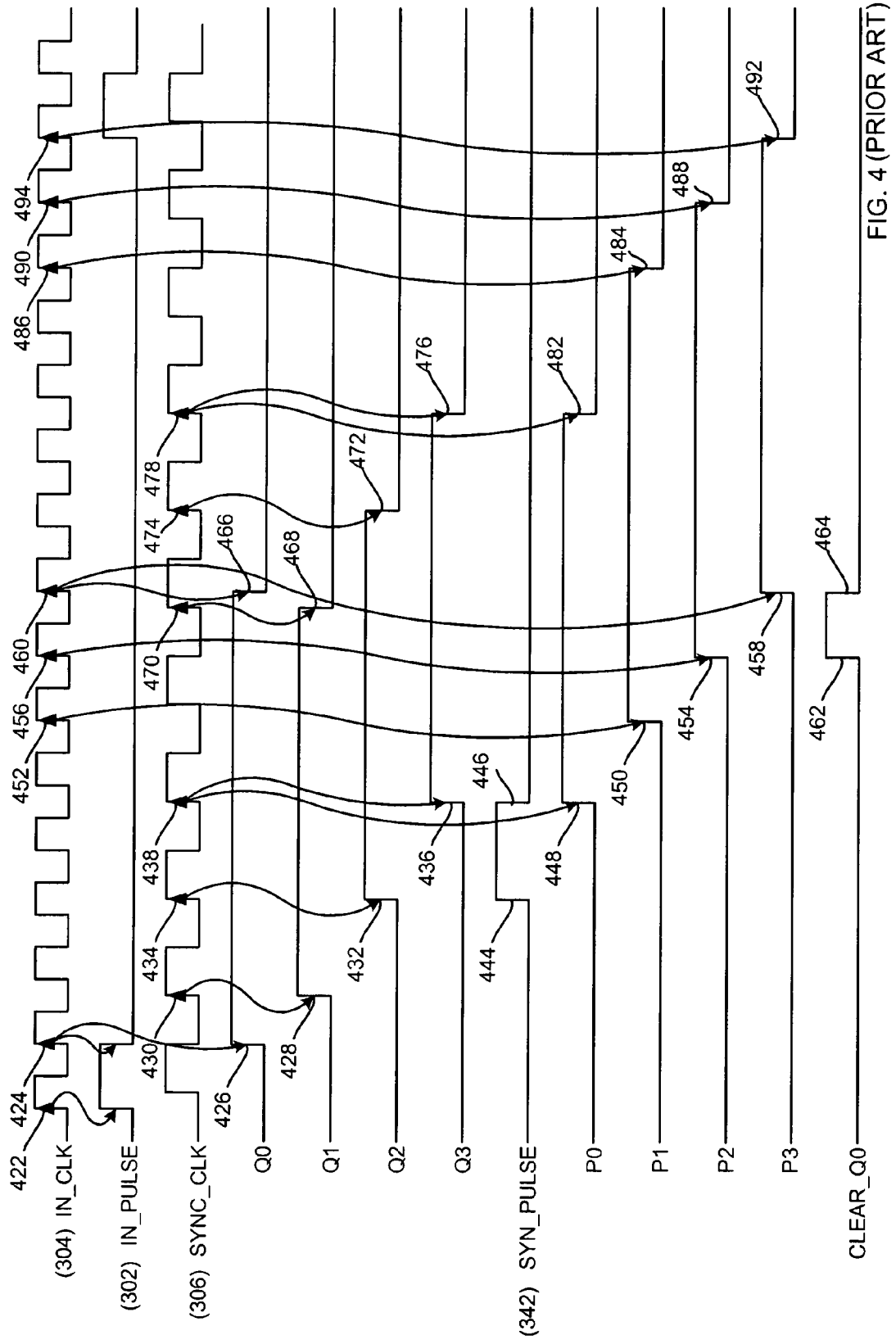

Further, as compared with the prior art implementation of FIG. 3, the synchronizing circuit 600 of FIG. 6 can operate with a higher frequency input signal IN_CLK. Instead of having to wait for 11 clock periods (6 SYNC_CLK periods and 5 IN_CLK periods as discussed in connection with FIGS. 3 and 4), the synchronizing circuit 600 of FIG. 6 needs only three clock periods in between pulses: one IN_CLK period (evidenced by rising edge 700) and two SYNC_CLK periods (evidenced by rising edges 708, 712). In some implementations, up to a 4× improvement in speed can be expected over prior art synchronization circuits. Given the fact that IC designers are always trying to find ways to improve speed, the ability of the synchronizing circuit 600 of FIG. 6 to operate with a higher frequency input signal IN_CLK also represents another significant advantage.

It should be noted that although the example of FIG. 6 employs the positive edge of the clocks to trigger the D flip-flops, one skilled in the art will readily appreciate that the D flip-flops may also be trigged by the negative edge of the clocks. Similarly, although the IN_PULSE is active high in the example of FIG. 6, it may also be an active low signal. The modifications required to synchronize using the negative edge of the clocks and/or active low signals are readily within the ability of those skilled in the art given this disclosure.

Further, although an XOR gate is employed in FIG. 6 to perform the function of a compare circuit, other compare circuits may also be employed. Again, the inputs and output of such compare circuit may be active low or active high, if desired. Still further, even though the example of FIG. 7 illustrates the synchronizing, using a slower clock, of an input signal that is originally synchronized with a faster clock, the inventive synchronizing circuit here may also be employed to synchronize, using a faster clock, an input signal that is originally synchronized with a slower clock.

In the example of FIG. 6, three D flip-flops are employed to address meta-stability issues. Meta-stability is a well known phenomenon and the use of cascaded flip-flops to reduce meta-stability is also known. However, it is entirely possible, if meta-stability issue is not to be addressed via cascading the flip-flops, to use fewer flip-flops (as few as one for the second clock domain gating circuit) or a greater number of flip-flops.

Thus, while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An integrated circuit configured to capture an input signal to produce an output signal, said input signal being synchronized with a first clock signal, said output signal being synchronized with a second clock signal having a second frequency different from a first frequency associated with said first signal, comprising:
   a first clock domain gating circuit having a first output terminal and a first input terminal, said first clock domain gating circuit being configured to be clocked by said first clock, said first input terminal being coupled to receive said input signal, said first clock domain gating circuit being configured to toggle a state of a signal on said first output terminal from one of a first state and a second state to the other of said first state and said second state every time a pulse is detected in said input signal, thereby producing a latched output at said first output terminal; and
   a second clock domain gating circuit having a second output terminal and a second input terminal, said second clock domain circuit being clocked by said second clock, said second input terminal being coupled to said first output terminal to receive said latched output, said second clock domain gating circuit being configured to produce a pulse on said output signal at said second output terminal, said pulse on said output signal having a duration at least as long as a period of said second clock every time a state of said latched output changes.

2. The integrated circuit of claim 1 wherein said first clock domain gating circuit includes a first D flip-flop, said first input terminal being coupled to an ENABLE input of said first D flip-flop, said first output terminal being coupled to a first output terminal of said first D flip-flop, said first D flip-flop further includes a first complementary output terminal and a first data input terminal, said first complementary output terminal being coupled to said first data input terminal.

3. The integrated circuit of claim 2 wherein said second clock domain gating circuit includes a plurality of cascaded D flip-flops and an XOR gate, wherein said second input terminal representing a data input terminal of one of said plurality of cascaded D flip-flops, an output of a next-to-last cascaded D flip-flop plurality of cascaded D flip-flops being coupled to a first input of said XOR gate, an output of a last-cascaded D flip-flop of said plurality of cascaded D flip-flops to a second input of said XOR gate, wherein said second output terminal of said second clock domain gating circuit is coupled to an output terminal of said XOR gate.

4. The integrated circuit of claim 3 wherein said second frequency is slower than said first frequency.

5. The integrated circuit of claim 1 wherein said second clock domain gating circuit includes a plurality of cascaded D flip-flops and an XOR gate, wherein said second input terminal representing a data input terminal of one of said plurality of cascaded D flip-flops, an output of a next-to-last cascaded D flip-flop plurality of cascaded D flip-flops being coupled to a first input of said XOR gate, an output of a last-cascaded D flip-flop of said plurality of cascaded D flip-flops being coupled to a second input of said XOR gate, wherein said second output terminal of said second clock domain gating circuit is coupled to an output terminal of said XOR gate.

6. The integrated circuit of claim 1 wherein said second frequency is slower than said first frequency.

7. A method for forming an integrated circuit, said integrated circuit being configured to capture an input signal in order to produce an output signal, said input signal being synchronized with a first clock signal, said output signal being synchronized with a second clock signal having a second frequency different from a first frequency associated with said first signal, comprising:
   providing a first clock domain gating circuit having first clock domain gating enable input, a first clock domain clock input, a first clock domain gating data input, a first clock domain gating output, and a first clock domain gating complementary output;
   coupling said input signal to said first clock domain gating enable input of said first gating circuit;
   coupling said first clock signal to said first clock domain gating clock input of said first clock domain gating circuit, thereby clocking said first clock domain gating circuit with said first clock signal;
   coupling said first complementary output of said first clock domain gating circuit to said first clock domain gating data input of said first clock domain gating circuit, wherein said first clock domain gating circuit being configured to toggle a state of a signal on said first clock domain gating output from one of a first state and a second state to the other of said first state and said second state every time a pulse is detected in said input signal, thereby producing a latched output signal at said first clock domain gating output; and
   providing a second clock domain gating circuit, said second clock domain gating circuit having a second clock domain gating input and a second clock domain gating output configured to output said output signal, said second clock domain gating circuit being clocked by said second clock signal; and
   coupling said first clock domain gating output to said second clock domain gating circuit input.

8. The method of claim 7 wherein said second clock domain gating circuit is configured to produce a pulse on said output signal at said second clock domain gating output, said pulse on said output signal having a duration at least as long as a period of said second clock every time a state of said latched output signal changes.

9. The method of claim 8 wherein said first clock domain gating circuit includes a D flip-flop.

10. The method of claim 8 wherein said second clock domain gating circuit includes an XOR gate having an XOR output terminal coupled to said second clock domain gating output.

11. A method for forming an integrated circuit, said integrated circuit being configured to capture an input signal to produce an output signal, said input signal being synchronized with a first clock signal, said output signal being synchronized with a second clock signal having a second frequency different from a first frequency associated with said first signal, comprising:

providing a first clock domain gating circuit comprising a first clock domain gating circuit output, said first clock domain gating circuit being clocked by said first clock signal, said first clock domain gating circuit being configured to receive said input signal and to toggle a state of said first clock domain gating circuit output upon detection of each pulse on said input signal, said first clock domain gating circuit also being configured to hold said state, after toggling, between said detection of said each pulse on said input signal;

providing a second clock domain gating circuit comprising a second clock domain gating circuit input and a second clock domain gating circuit output configured for outputting said output signal, said second clock domain gating circuit being clocked by said second clock signal; and coupling said first clock domain gating circuit output to said second clock domain gating circuit input.

12. The method of claim 11 wherein said pulse on said input signal is an active high pulse.

13. The method of claim 11 wherein said pulse on said input signal is an active low pulse.

14. The method of claim 13 wherein said first clock domain gating circuit is a first D flip-flop, said first clock domain gating circuit output being a first D flip-flop output.

15. The method of claim 14 wherein said first D flip-flop further comprises a first D flip-flop complementary output and a first D flip-flop data input, wherein said first D flip-flop complementary output is coupled to said first D flip-flop data input.

16. The method of claim 15 wherein said input signal is coupled to an enable input of said first D flip-flop.

17. The method of claim 16 wherein said second clock domain gating circuit comprises a plurality of cascaded D flip-flops and an XOR gate having a first XOR input, a second XOR input, and an XOR output, each of said plurality of cascaded D flip-flops being clocked by said second clock signal, an output of a last cascaded D flip-flop of said plurality of cascaded D-flip-flops being coupled to said first XOR input, an output of a next-to-last-cascaded D flip-flop of said plurality of cascaded D flip-flops being coupled to said second XOR input, said XOR output being coupled to said second clock domain gating circuit output.

18. The method of claim 17 wherein said first D flip-flop output is coupled to a data input of a first cascaded D flip-flop of said plurality of cascaded D flip-flops.

19. A method for forming an integrated circuit, said integrated circuit being configured to capture an input signal to produce an output signal, said input signal being synchronized with a first clock signal, said output signal being synchronized with a second clock signal having a second frequency different from a first frequency associated with said first signal, comprising:

providing a first clock domain gating circuit having a first output terminal and a first input terminal, said first clock domain gating circuit being configured to be clocked by said first clock, said first input terminal being coupled to receive said input signal, said first clock domain gating circuit being configured to toggle a state of a signal on said first output terminal from one of a first state and a second state to the other of said first state and said second state every time a pulse is detected in said input signal, thereby producing a latched output at said first output terminal; and providing a second clock domain gating circuit having a second output terminal and a second input terminal, said second clock domain circuit being clocked by said second clock, said second input terminal being coupled to said first output terminal to receive said latched output, said second clock domain gating circuit being configured to produce a pulse on said output signal at said second output terminal, said pulse on said output signal having a duration at least as long as a period of said second clock every time a state of said latched output changes.

20. The method of claim 19 wherein said first clock domain gating circuit includes a first D flip-flop, said first input terminal being coupled to an ENABLE input of said first D flip-flop, said first output terminal being coupled to a first output terminal of said first D flip-flop, said first D flip-flop further includes a first complementary output terminal and a first data input terminal, said first complementary output terminal being coupled to said first data input terminal.

21. The method of claim 20 wherein said second clock domain gating circuit includes a plurality of cascaded D flip-flops and an XOR gate, wherein said second input terminal being coupled to a data input terminal of one of said plurality of cascaded D flip-flops, an output of a next-to-last cascaded D flip-flop plurality of cascaded D flip-flops being coupled to a first input of said XOR gate, an output of a last-cascaded D flip-flop of said plurality of cascaded D flip-flops being coupled to a second input of said XOR gate, wherein said second output terminal of said second clock domain gating circuit is coupled to an output terminal of said XOR gate.

* * * * *